Oct. 30, 1956 A. DE FURIO 2,768,442
JIG FOR ARTICULATOR
Original Filed Feb. 17, 1954 2 Sheets-Sheet 1

INVENTOR.
ANTHONY DE FURIO
BY
Anthony De Furio

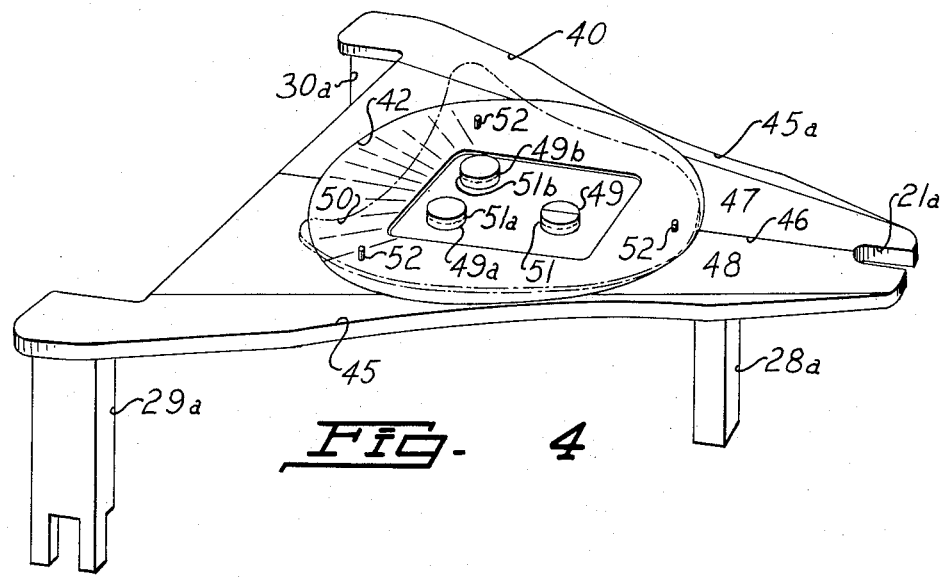
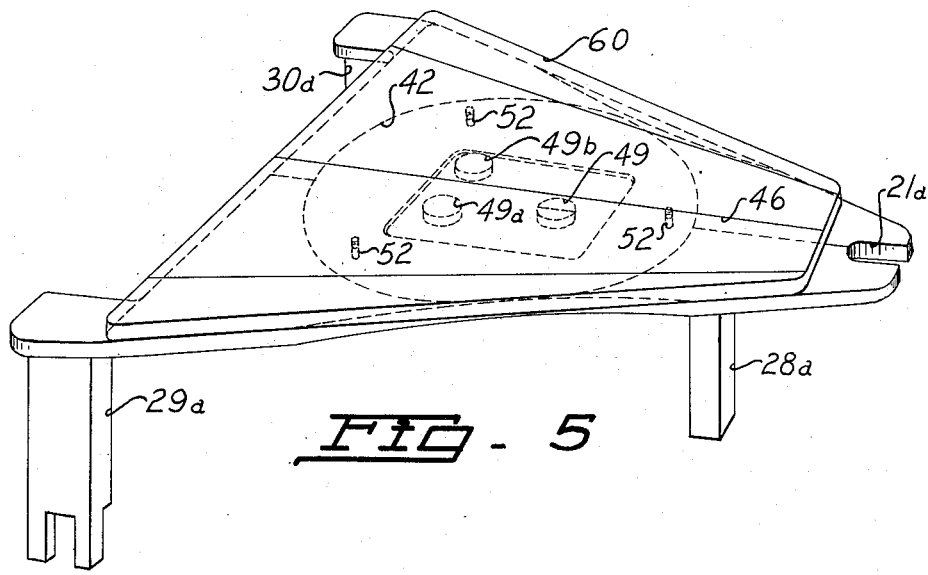

United States Patent Office 2,768,442
Patented Oct. 30, 1956

2,768,442

JIG FOR ARTICULATOR

Anthony De Furio, Kenosha, Wis.

Substituted for abandoned application Serial No. 410,929, February 17, 1954. This application November 3, 1955, Serial No. 544,673

4 Claims. (Cl. 32—32)

This invention relates to improvements in mechanism to be used in combination with a so-called articulator used in the formation of the masticatory surfaces of natural and artificial dentures.

It is an object of my invention to provide a surface which is arranged to operate in conjunction with a mechanical articulator and provide a plane surface forming that divisional line between the upper and lower masticating surfaces of true dentures. This line is determined in using an articulator of well known design by stretching a rubber band from about the vertically extending supports forming a tripod with one of said supports having a circular slot formed intermediate its ends and with said band arranged to be in the same plane relative to all of said supports. The disposition of the band is usually aided by placing indicating marks on the other legs and in line with the slot on the above mentioned support. While a skilled operator may perform excellent work by using such band, nevertheless, it is necessary that satisfactory results are determined by the ability of an operator to line up by eye and the displacement of the band is always prevalent. Even a slight variation by incorrect lining up or band displacement will necessitate expensive grinding with possible spoiling of dentures.

A further object of my invention therefore, is to provide a mechanical plane surface which may be arranged between the legs of said articulator. This plane surface will have a line, the front or forward end being in direct alignment with the circular slot in one of said supports and extending back and directly between and equidistant from the other legs.

One of the features of the present invention is characterized by providing a body, triangular in shape having a support depending downwardly and at substantially right angles therefrom at the forward end of said body and which rests on the face of the base of said articulator, immediately back of said circular slot and having opposed extensions on the trailing edge of said body whereby the inside surface of each extension fits on the outside of each other support. In addition I provide a support depending downwardly and at substantially right angles from each of said extensions. The free end of each of said latter supports are notched to rest on lugs formed on the base of said articulator. To compensate for any variation in engagement of said notched end supports and lugs, I provide adjustment members whereby the plane surface can be maintained at the correct level.

The invention possesses other objects and features of advantage, some of which, with the following, will be set forth in the following description of the preferred form of the invention which is illustrated in the drawings accompanying and forming part of the specification. It is to be understood, however, that variations in the showing made by the said drawings and description may be adapted within the scope of the invention as set forth in the claims.

Referring to the drawings:

Figure 4 is a modification of my invention.

Figure 5 is a further modification of my invention.

Figures 1, 2, 3:
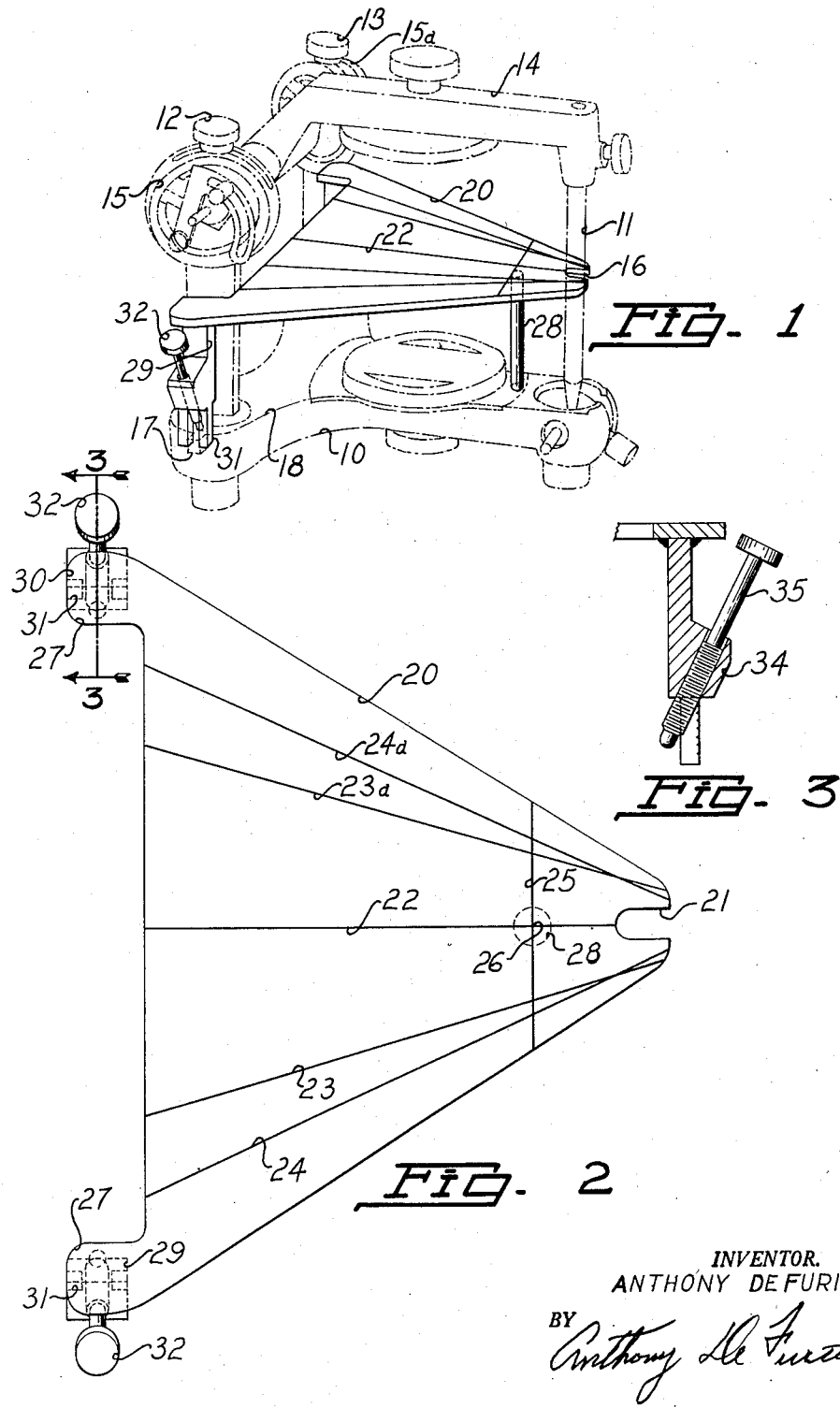
Figure 1 is a diagrammatic elevational view of an articulator employing the present invention.
Figure 2 is a face view of my invention.
Figure 3 is a detail view partially in cross-section of the adjustment member used with my invention on line 3—3 of Fig. 2.

Referring now in detail to the drawings, an articulator is indicated generally at 10 in Figure 1. The articulator is provided with the supports 11, 12 and 13 with 11 arranged to be raised and lowered through the pivotal connection of over-arm 14 about the corner supports 15 and 15a associated directly with the stationary corner posts or supports 12 and 13 respectively.

The support 11 is provided with the usual aligning slot 16, and the supports 12 and 13 provided with the spaced lugs 17, one each arranged on the outside surface of each support adjacent the base 18 of the articulator.

Considering now the construction shown in Figures 2 and 3, inclusive, the invention includes a triangularly shaped plane surface 20, the front portion of said surface having an enlarged notch 21 which in operative position partially encircles the support 11 with the slot 16 in direct line with a line 22 which stretches from the front of said plane surface to the back of said surface and dividing said surfaces into two equal parts.

Additionally equally spaced line 23 and 23a and 24 and 24a are arranged to correctly space denture casts when the casts are being made.

Another line 25 is struck cross-wise of the first mentioned lines and at right angles to the center line 22. This line is used to space the front of the cast. In other words, the exact center of the front surface of the upper cast is positioned directly on the point of intersection 26 of line 25 and line 22 with the outside surface of similar masticating surfaces on each side of the point of intersection 26 equally spaced from spaced lines 23 and 23a and 24 and 24a.

The trailing edge of plane surface 20 has a projection 27 at each end and spaced apart sufficiently to enclose therebetween the supports 12 and 13.

A rod 28 is fixed to the underside of the plane surface 20 and extends at right angles therefrom from the point 26. One each of a pair of columns 29 and 30 of like cross-wise dimension and length depend from the underside of each of the projections 27 and have their free end forked as designated by the numeral 31 to receive the lugs 17. An adjustment member 32 may be associated with each column 29 or 30 whereby said columns may be adjusted to maintain said plane surface 20 in substantially right angles to the supports 11, 12 and 13 and the circular or aligning slot 16. This adjustment is illustrated more fully in Fig. 3 and includes a boss 34 formed on the free end of each support 12 and 13 which is bored and threaded to receive an adjustment screw 35.

Figure 4 has reference to another form of plane surface wherein I present a second triangularly shaped surface similar to that of Figure 2. In the surface 40 I provide an enlarged dish-shaped depression 42 covering a substantial area, the outer circumferential surface spaced equidistant from the sides 45 and 45a with the medium line 46 dividing the surface 40 into two equal parts as designated by the numerals 47 and 48. Three pegs 49, 49a and 49b are set within the depressed area 42 with peg 49 set on the line 46 and divided equally by said line 40. The other pegs 49a and 49b are arranged back of peg 49 with each disposed exactly the same distance from line 46 and in line with one another. A cup-shaped cast holding member 50 is temporarily mounted in the depressed area 42 having apertures 51, 51a and 51b spaced to fit over the pegs 49, 49a and 49b respectively. Here the aperture 51 is divided equally by the line 46 with the apertures 51a and 51b spaced equally from the sides of said cup 50 and equidistant from the line 46. A series of similarly shaped pegs 52 are arranged in the underside of said member 50 to bear against the depressed surface 42 and retain said member 50 in a stable condition without the least rocking. In this particular formation the cast is placed on said member 50 with the extreme center of the front of the masticatory surface in alignment with the line 46 and the corresponding masticatory surfaces arranged equidistant from the line 46 and from the opposed edges of the member 50. A notch 21a arranged in the front part of the surface 40 functions exactly as notch 21 of Figure 2.

A rod 28a and columns 29a and 30a are fixed to the underside of surface 40 and functions as the rod 28 and columns 29 and 30 of that in Figure 2. While the adjustment as shown in Figures 2 and 3 are not shown with the device of Figure 4 it is contemplated that such adjustment can be readily had.

Figure 5 has exactly the same structure as Figure 4 with the exception that instead of applying the cup member 50, I apply a flat triangular plate 60 instead. This plate has apertures arranged in its undersurface to receive the pegs 49, 49a and 49b as shown in Figure 4 with said apertures arranged as the apertures of the cup member 50. In this particular application the flat surface of plate 60 has similar lines as shown in Figure 2 and in operation will function as the device of Figure 2.

It is thought that the construction, manipulation, utility, and advantages of this invention will now be apparent to those skilled in the art without a more detailed description thereof.

The present embodiment of the invention has been described in considerable detail merely for the purposes of exemplification since in actual practice it attains the features of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim is:

1. In combination with an articulator for forming dental masticatory surfaces, a plane surface comprising a substantially flat triangular shaped body having a slot cut in the forward end and spaced projections of equal width and length formed in the trailing end, a line inscribed on said body bisecting said slot and said body in two equal parts, lines arranged on each side of said first mentioned line and equidistant therefrom, a column depending at right angles from each projection another column depending from said body adjacent said slot, each column secured to the bottom of said body, said columns arranged on the base of said articulator whereby the top face of said body is at right angles to said columns.

2. The combination of claim 2 including adjustment members secured adjacent the free ends of said first mentioned columns for vertical adjustment of said first mentioned columns.

3. In combination with an articulator for forming dental masticatory surfaces, a plane surface comprising a triangularly shaped bottom plate, said bottom plate provided with a column adjacent each corner and depending downwardly at right angles from the bottom of said plate, said plate having a slot cut in the forward end, a depressed area formed in the upper face of said plate and provided with protruding members spaced within said depressed area, a second plate arranged over said first mentioned plate and having spaced apertures to receive said protrusions to position said second plate on said first mentioned plate, the free ends of said columns arranged on the base of said articulator for positioning said plane surface on said articulator.

4. In combination with an articulator for forming dental masticating surfaces, a plane surface comprising a flat triangularly shaped bottom plate, said bottom plate provided with a column adjacent each corner and depending downwardly at right angles from the bottom of said plate, said plate having a slot cut in the forward end, a depressed area formed in the upper face of said plate and provided with protruding elements spaced within said depressed area, a second flat triangular plate arranged over said first plate and provided with spaced apertures to receive said protruding elements to locate said second plate in a predetermined position, the free ends of said columns arranged on the base of said articulator for positioning said plane surface on said articulator.

No references cited.